United States Patent [19]

Swanborn

[11] Patent Number: 4,975,101
[45] Date of Patent: Dec. 4, 1990

[54] DEVICE FOR SEPARATING LIQUID DROPLETS FROM A GAS STREAM

[75] Inventor: Rombout A. Swanborn, BL Delft, Netherlands

[73] Assignee: Shell International Research Maatschappij B.V., The Hague, Netherlands

[21] Appl. No.: 369,234

[22] Filed: Jun. 22, 1989

[30] Foreign Application Priority Data

Jun. 23, 1988 [NL] Netherlands ............. 8801596

[51] Int. Cl.$^5$ .................................. B01D 45/00
[52] U.S. Cl. .......................................... 55/440
[58] Field of Search ........................... 55/440

[56] References Cited

U.S. PATENT DOCUMENTS

| | | | |
|---|---|---|---|
| 1,926,924 | 9/1933 | Sylvan | 55/440 |
| 3,405,511 | 10/1968 | Halter et al. | 55/440 |
| 3,938,972 | 2/1976 | Sugimura | 55/440 |
| 4,175,938 | 11/1979 | Regehr et al. | 55/440 |
| 4,543,108 | 9/1985 | Wurz | 55/440 |

FOREIGN PATENT DOCUMENTS

| | | | |
|---|---|---|---|
| 0233332 | 8/1987 | European Pat. Off. | 55/440 |
| 257368 | 5/1912 | Fed. Rep. of Germany . | |
| 2823942 | 1/1979 | Fed. Rep. of Germany . | |
| 3702830 | 2/1988 | Fed. Rep. of Germany | 55/440 |
| 2395061 | 1/1979 | France . | |
| 1155067 | 6/1969 | United Kingdom . | |
| 1465044 | 2/1977 | United Kingdom | 55/440 |
| 1503756 | 3/1978 | United Kingdom . | |

Primary Examiner—Bernard Nozick
Attorney, Agent, or Firm—Jones, Tullar & Cooper

[57] ABSTRACT

Device for the separation of liquid droplets from a gas stream comprising a plurality of wave plates (1, 2 and 3) arranged close to one another in such a way that a passage (5, 12) is defined between two adjacent plates, which passage alternately comprises a narrowing part (21) and a widening part (22) that is joined to the narrowing part (22), wherein a bend in the passage lies between the largest width of the widening part (22) and the smallest width of a narrowing part (21) that is joined to the widening part (22).

4 Claims, 2 Drawing Sheets

DEVICE FOR SEPARATING LIQUID DROPLETS FROM A GAS STREAM

FIELD OF THE INVENTION

The present invention relates to a device for the separation of liquid droplets from a gas stream, comprising a plurality of wave plates arranged close to one another in such a way that a passage is defined between two adjacent plates, which passage alternately comprises a narrowing part and a widening part that is joined to the narrowing part.

DESCRIPTION OF THE PRIOR ART

During normal operation of this device, gas with liquid droplets flows through the passage. Gas comes into contact with the walls of the wave plates that define the passage. As a result of this contact, the liquid droplets collect on the wall and gas with substantially no liquid droplets leaves the passage.

To reduce the detrimental effect of vortices on the separation efficiency of the separator, each passage of the known device alternatively comprises a narrowing part and a widening part that is joined to the narrowing part, wherein the largest width of the widening part is located at the location of the largest curvature (smallest radius of curvature) of the bend.

SUMMARY OF THE INVENTION

It is an object of the present invention to improve the known device.

To this end the device for the separation of liquid droplets from a gas stream according to the invention comprises a plurality of wave plates arranged close to one another in such a way that a passage is defined between two adjacent plates, which passage alternately comprises a narrowing part and a winedning part that is joined to the narrowing part, wherein a bend in the passage lies between the largest width of the widening part and the smallest width of the narrowing part that is joined to the widening part. The geometry of the passage is defined with respect to the axis of the passage.

An advantage of the device according to the present invention is that the shape of the passage prevents turbulence in the gas stream which could have an adverse effect on the separating function of the device, as the formation of vortices is suppressed over a part of the passage beginning before the location of the largest curvature (smallest radius of curvature) of the bend.

BRIEF DESCRIPTION OF THE DRAWINGS

The invention will now be discussed by way of example in more detail with reference to the accompanying drawings in which.

DESCRIPTION OF THE PREFERRED EMBODIMENTS

Figure 1:
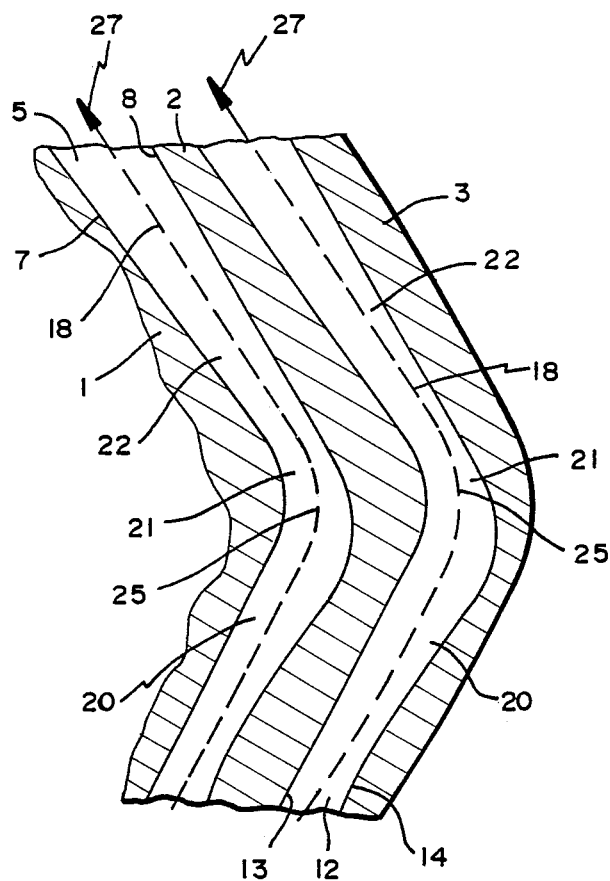
FIG. 1 is a schematic vertical cross-sectional view of three plates of a first device according to the present invention.

The three wave plates shown in the FIG. 1 are indicted by reference numerals 1, 2 and 3, the longitudinal axes of the plates 1, 2, and 3 being perpendicular to the drawing plane of the figure. The wave plates 1 and 2 are arranged near each other in such a way that a passage 5 is defined between the external surfaces of the facing walls 7 and 8 of the plates 1 and 2, and a passage 12 is defined between the external surfaces of the facing walls 13 and 14 of the wave plates 2 and 3 arranged near each other.

The axes of the passages 5 and 12 are indicated by brocken lines 18.

Each of the passages 5 and 12 comprises a widening part 20, a narrowing part 21 that is joined to the widening part 20, and a widening part 22 that is joined to the narrowing part 21.

The largest width of each of the widening parts 20 is upstream of the bend 25 in the axis of the passage 5 or 12, and the smallest which of each of the narrowing parts 21 is downstream of the bend 25 so that a bend in the passage lies between the largest width of the widening part and the smallest width of the narrowing part that is joined to the widening part.

The device for the separation of liquid droplets from a gas stream is placed in a vessel (not shown) provided with an inlet (not shown) and an outlet (not shown) in such a way that the device lies between the inlet and the outlet, the gas stream flowing through the device in a direction indicated by arrows 27.

During normal operation, gas with liquid droplets flows from the inlet to the outlet through the passages 5 and 12 of the device according to the invention. The gas stream collides with the external surfaces of the facing walls 7 and 8 and the facing walls 13 and 14, as a result of which the liquid droplets collect on the walls 7, 8, 13 and 14. Gas substantially free from liquid droplets leaves the device and flows to the outlet.

If the device is oriented such that the longitudinal axes of the plates 1, 2 and 3 run vertically, the droplets on the walls 7, 8, 13 and 14 will collect on the bottom edges of the plates. From here, the droplets can be led to a container (not shown) provided with a discharge (not shown).

Preferably, the ratio of the largest width of the widening part to the smallest width of the narrowing parts is between 1.3:1 and 2:1.

In order to prevent further formation of undersired turbulence in the gas stream in the widening part of the passage, the angle between the walls that define that part of the passage are suitably chosen between 1° and 10° and very suitably between 3° and 8°.

Figure 2:
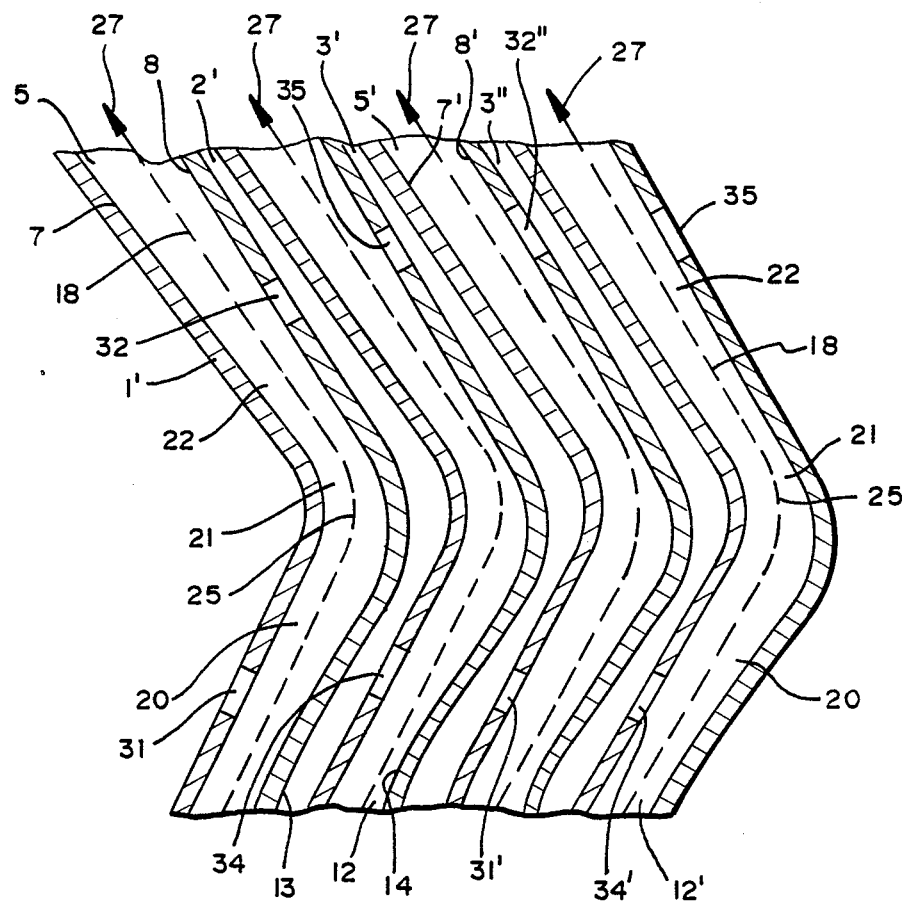
FIG. 2 is a schematic vertical cross-sectional view of three hollow bodies of a second device according to the present invention.

In an alternative embodiment, hollow thin wave-shaped bodies replace the plates and the walls of these are provided with orifices through which liquid on the walls can flow into the hollow of the bodies. This alternative embodiment is depicted in FIG. 2 wherein hollow-thin wave-shaped bodies 1', 2' and 3' are provided with orifices 31, 32, 34 and 35 and wherein the other reference numerals designate structure the same as the same reference numerals designate in FIG. 1.

This last embodiment is suitable for those applications of the device according to the invention in which the longitudinal axes of the plates run horizontally.

The parts of the wave plates 1, 2 and 3 extend over a half wave. The plates can also extend over a whole wave or over a greater number of waves.

If the wave plates 1, 2 and 3 were to extend over a whole wave, they could be shaped such that every passage exhibited a narrowing part whose smallest width was downstream of the not shown bend in the passage downstream of the largest width of the widening part 22, said narrowing part being followed by a widening part.

The device according to the invention can also comprise more than three wave plates arranged close to one another.

I claim:

1. A device for use in the separation of liquid droplets from a flowing gas stream, said device comprising:
   a plurality of thin, hollow walled wave-shaped bodies arranged generally adjacent each other to form a plurality of generally adjacent gas stream flow passages, each of said gas stream flow passages being defined by adjacent ones of said plurality of thin, hollow walled wave-shaped bodies;
   each of said gas stream flow passages having, in the direction of gas flow, a first widening part having a largest width, a narrowing part having a first end which is joined to said largest width of said first widening part and having a second, smallest width end, a second widening part joined to said second, smallest width end of said narrowing part;
   a bend in each of said plurality of gas stream flow passages, each said bend being located between said largest width of said first widening part and said smallest width of said narrowing part which is joined to said first widening part; and
   orifices provides in said walls of said thin, hollow walled wave-shaped bodies, said orifices allowing liquid droplets that collect on said walls of said gas stream flow passages to pass into said hollow bodies.

2. The device of claim 1, wherein a ratio between said largest width of said first widening part and said smallest width of said narrowing part is between generally about 1.3:1 and 2:1.

3. The device of claim 1 wherein an angle between said adjacent ones of said plurality of thin, hollow walled wave-shaped bodies that define said widening parts of said passages is between generally about 1° and 10°.

4. The device of claim 3 wherein said angle is between generally about 3° and 8°.

* * * * *